Sept. 7, 1937.   V. H. BODLE   2,092,240
METHOD OF MAKING RUBBER ARTICLES
Filed March 6, 1933   2 Sheets-Sheet 1
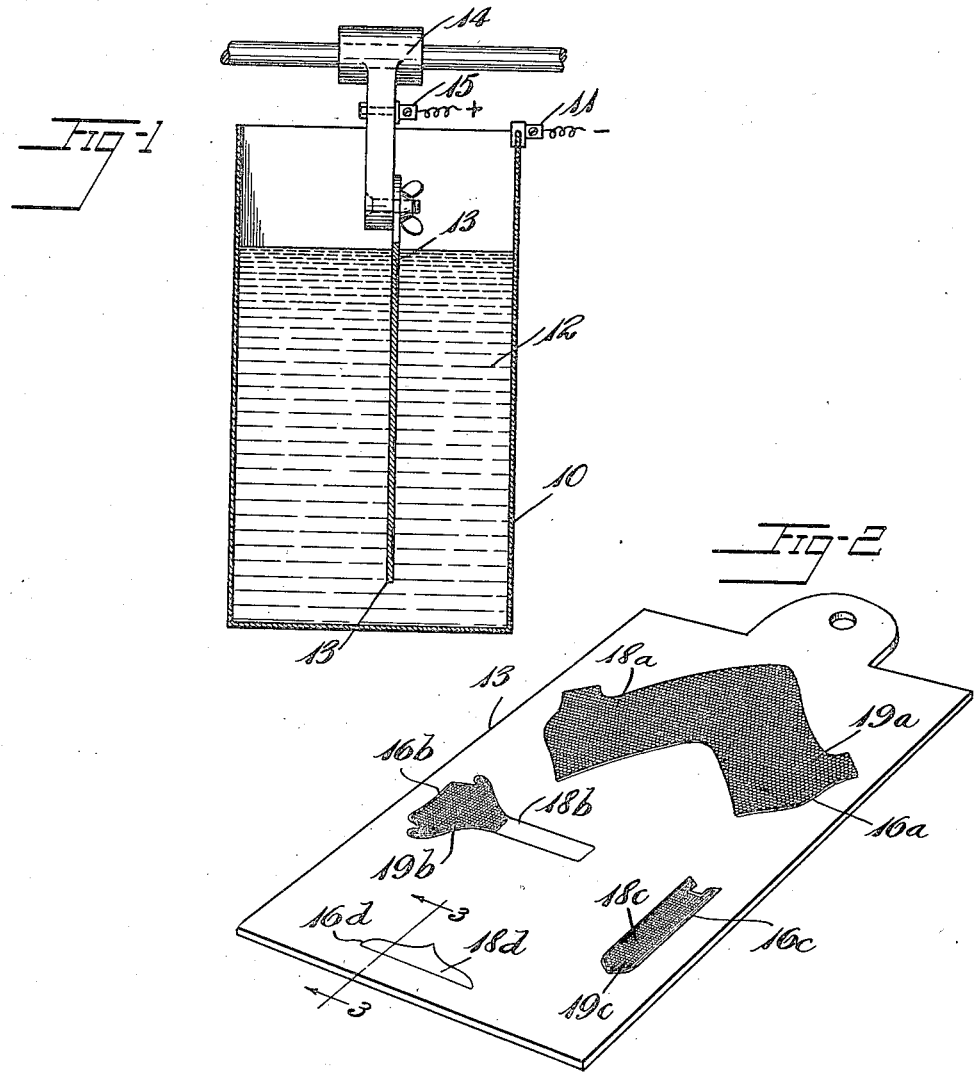
Inventor
Virgil H. Bodle
By Eakin & Avery
Attys

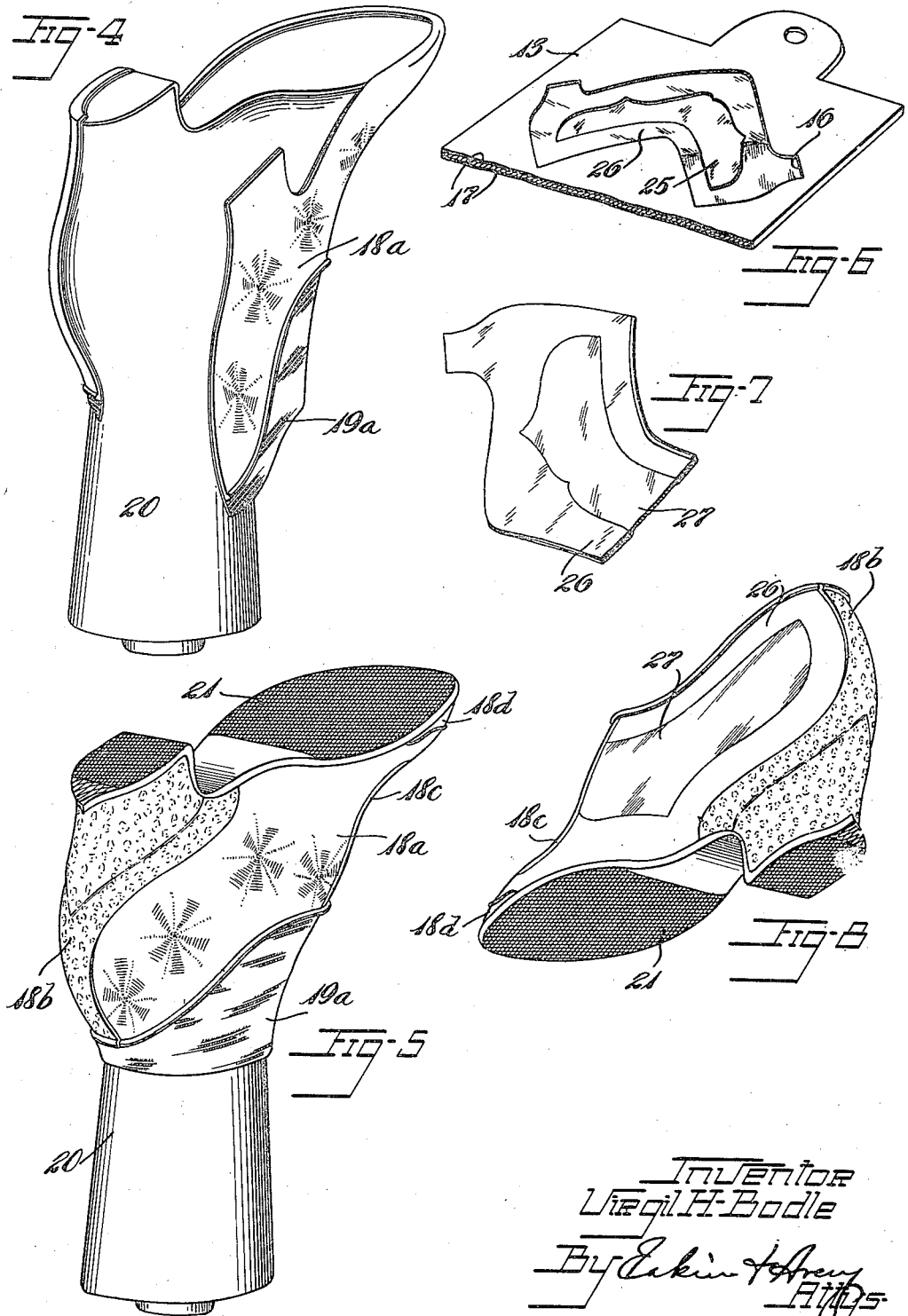

Patented Sept. 7, 1937

2,092,240

UNITED STATES PATENT OFFICE 2,092,240

METHOD OF MAKING RUBBER ARTICLES

Virgil H. Bodle, Newton, Mass., assignor to The B. F. Goodrich Company, New York, N. Y., a corporation of New York Application March 6, 1933, Serial No. 659,634

5 Claims. (Cl. 18—58)

This invention relates to rubber articles of the type usually constructed from a number of component parts of sheet material, and to a method of making such articles.

Rubber articles of the above type have been made heretofore by a method involving mill-mixing of the rubber compound used in the manufacture, calendering of the mill-mixed compound into a thin sheet, and the impregnation of fabric with such compound by a similar calendering operation, followed by cutting or dieing of the several component parts of the article from the sheet material so prepared, and assembling those parts to form the article. Such a method consumes much time, labor, and power, and creates considerable waste and composite scrap resulting from the dieing or cutting of the often irregularly shaped parts from the calendered sheet material which factors combine to make the process inherently expensive.

The object of the present invention is to provide a method of making rubber articles of the type described which will eliminate the expensive operations of prior processes, which will create a minimum of waste material, and further, which will produce rubber articles possessing properties which for certain types of service are distinctly superior to prior products.

In brief, the invention comprises the deposition of solids from an aqueous dispersion of rubber on a suitable mold to form directly component parts of an article in the size and shape in which they are to be incorporated in the article, and assembling the so-prepared parts to form the article.

The electrophoretic method of depositing rubber on a mold is peculiarly adapted for use in the present invention, in that it provides a rapid, relatively inexpensive method of creating coherent rubber deposits of almost any desired shape, and the use of such a process in connection with the present invention applied to the manufacture of an article comprising several component parts of sheet material, such as a rubber shoe, will be described with reference to the accompanying drawings in which Fig. 1 is a vertical section through apparatus for electro-depositing rubber within the cavities of a mold, and the mold therein;

Fig. 2 is a perspective view of the mold with rubber deposits in the cavities thereof, and with fabric lining elements over portions of the rubber deposits;

Fig. 3 is a vertical section on line 3—3 of Fig. 2;

Fig. 4 is a perspective view of a shoe last with prepared parts of a shoe being assembled thereon;

Fig. 5 is a like perspective view of the last with the shoe completely assembled thereon;

Fig. 6 is a perspective view of part of a mold slightly modified and adapted to produce bi-colored sheet articles, with a portion of such an article therein;

Fig. 7 is a perspective view of a bicolored sheet article such as a rubber shoe part made according to a modification of the present invention, and partially broken away to show more clearly the structure thereof;

Fig. 8 is a perspective view of a completed shoe made according to the present invention and embodying the bicolored shoe part of Fig. 7.

In practicing the invention, a metal tank 10 serving as a cathode is connected to the negative terminal 11 of a source of direct current, and the tank filled with an aqueous dispersion of rubber 12 in which is immersed an engraved mold or anode plate 13 suspended from a hanger 14 which is connected to the positive terminal 15 of the source of direct current.

The anode mold plate 13 may be made of zinc, cadmium, or other metal capable of anodic solution without the generation of gas, and whose salts do not have an undesirable effect on rubber. The plate is provided with engraved cavities 16, a, b, c, d, more clearly shown in Fig. 3, having the shapes of the several parts composing the article being made, for example, a rubber shoe, the surface of the plate between the cavities being insulated by means of a layer 17 of dielectric material.

When an electric current is passed from the positive terminal 15 through the hanger 14, the anode mold plate 13 and thence through the aqueous dispersion 12 to the cathode tank 10 and the negative terminal 11, the negatively charged rubber or other dispersed particles in the aqueous dispersion 12 migrate under the influence of the current to the anode mold 13 and are coagulated upon the exposed surfaces thereof in the form of coherent deposits 18, a, b, c, d. Since no current passes through the insulating coating 17, no rubber is deposited on the surfaces covered by it, and the deposits are confined to the exposed cavities, which may have any desired shape such as the several parts of a shoe, as hereinabove indicated.

After the deposits 18 have acquired the desired thickness, preferably substantially filling the mold cavities 16, the current is interrupted and the mold plate 13 with the adherent rubber deposits 18 removed from the tank and washed, or the excess liquid dispersion otherwise removed therefrom. The rubber deposits are then dried by evaporating the water therefrom, either by natural or forced means, and either while the deposits remain in the mold cavities or after removal therefrom.

If it is desired to build a shoe, or other article, having a fabric lining or similar reenforcing element, the fabric, either plain or rubberized, may be cut to the size and shape of the corresponding part of the shoe with which it is to be associated, and pressed into adhesive engagement with such rubber part, preferably while the latter is in the mold cavity. Such fabric elements are indicated in the drawings as 19, a, b, c, associated with the rubber parts 18, a, b, c. In some cases, it will be desirable to cut the fabric elements somewhat larger than the corresponding rubber parts, so that the fabric when associated with the rubber will extend past certain edges of the rubber part, for reasons hereinafter explained.

The several component sheet elements of the shoe, namely, the upper, the back-stay, the finishing strip, and the toe-cap prepared as above described, are then assembled upon a form or last 20 and a sole and heel element 21 which may be formed in the manner of the present invention, or calendered and cut to shape according to the method of prior processes, or in other manners, is associated with the assembly to complete the shoe structure.

The building and assembling operations and procedure may be similar to that now commonly practiced in shoe manufacture, employing any necessary adhesives, etc., to securely bond the several parts together.

As indicated above, the fabric lining 19a should preferably extend past the upper margins of the shoe proper, so that the extending portion may be taped or otherwise secured to the last 20 to exclude air, steam, water, etc., during vulcanization of the shoe, which is carried out in the conventional manner, preferably in hot air or open steam.

When vulcanization is complete, the shoe is removed from the last and the extending portions of the lining are trimmed off to produce a finished shoe as illustrated in Fig. 8.

The method of the present invention lends itself unusually well to the manufacture of decorated rubber articles. The mold cavities may be engraved with any desired design, which will be faithfully duplicated in the deposited rubber to produce a beautifully decorated surface on the finished article.

Multi-color effects may be readily achieved through a slight modification of the procedure as hereinabove described. If a portion of the surface of a cavity 16 in the mold plate 13 be covered with a film or layer 25 of dielectric material such as shellac, or adherent paper, and rubber 26 electro-deposited on the exposed cavity surfaces in the manner heretofore described, no rubber will be deposited upon the insulated area 25. Then if the dielectric material be removed from the cavity and, without drying the first deposit 26, the mold plate be immersed in a second tank containing a rubber dispersion of another color, and electro-deposition resumed, a second layer of rubber 27 of a color differing from the first, will be deposited over the first layer and also over the areas from which insulation was removed, which areas will appear in well defined outlines upon the removal of the deposit from the cavity, thus producing a rubber sheet in a desired shape and having sharply defined decorative colored areas on one side thereof and integral therewith, which may be incorporated in a shoe structure such as that of Fig. 8 in the manner described.

Although this invention is particularly useful in the manufacture of rubber footwear, it obviously is not limited to such use but may be employed with equal efficiency in making any of the countless rubber articles commonly built up from a number of elements or parts of sheet material such as hot water bottles, bathing caps, swimming bags, etc., in each case effecting all the economies in manufacture hereinabove set forth.

Further, articles of distinctly superior physical properties are produced by the present method as a result of the familiar additional toughness and strength of electro-deposited rubber as compared to rubber which has been masticated as required in prior methods of manufacture.

The term "rubber" has been used in a generic sense to include caoutchouc, balata, gutta percha, and similar natural or artificial gums and resins, whether in the unvulcanized, vulcanized, or reclaimed condition. Likewise, the term "aqueous dispersion of rubber" includes flowable liquids made by dispersing rubber as hereinabove defined in an aqueous liquid, either with or without the aid of dispersing and/or stabilizing agents, as well as latices of rubber producing plants, either in a natural state or modified by dilution, concentration and/or by the addition of thickening, thinning, or other modifying materials. The aqueous dispersions of rubber should preferably contain vulcanizing agents, accelerators, age-resisters, fillers, and other compounding ingredients commonly employed in rubber compositions.

I claim:

1. The method of making an article of assembled rubber parts which comprises separately forming a plurality of the rubber parts in the flat by deposition from an aqueous dispersion of rubber, at the same time providing the parts with finally formed edge portions directly by the act of such deposition, and assembling the parts upon a contoured form.

2. The method of making an article of assembled rubber parts which comprises separately forming a plurality of the rubber parts and at the same time providing the parts with finally formed edge portions, all directly by depositing the rubber from an aqueous dispersion thereof into open mold cavities, removing the formed parts from the mold cavities and assembling them.

3. The method of making an article of assembled rubber parts which comprises separately forming a plurality of the rubber parts in the flat, at the same time providing the parts with finally formed edge portions and surface configuration, all directly by depositing the rubber from an aqueous dispersion thereof into open mold cavities, removing the formed parts from the mold cavities and assembling them upon a contoured form.

4. The method of making an article of assembled rubber parts which comprises forming a plurality of the rubber parts in the flat, at the same time providing the parts with finally formed edge portions and surface configurations, all directly by electrodepositing rubber from an aqueous dispersion thereof in the cavities of an engraved anode plate, removing the formed parts from the plate cavities and assembling them upon a contoured form.

5. A method as defined in claim 4 in which at least one of the rubber parts is ornamented by electrodepositing rubber from an aqueous dispersion thereof in a plate cavity having a portion of its surface masked by an insulating material, then removing portions of the insulating material from the plate, then electrodepositing rubber from another aqueous dispersion of rubber over the first deposit and unmasked area to provide adjoining rubber surfaces of different appearance on the part, and removing the part from the plate cavity for the operation of assembling it with the other rubber parts.

VIRGIL H. BODLE.